United States Patent
Golshan et al.

(10) Patent No.: US 10,389,538 B2
(45) Date of Patent: Aug. 20, 2019

(54) PROCESSING A SECURITY POLICY FOR CERTIFICATE VALIDATION ERROR

(71) Applicant: A10 Networks, Inc., San Jose, CA (US)

(72) Inventors: Ali Golshan, Palo Alto, CA (US); Xuyang Jiang, Saratoga, CA (US); Yang Yang, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 262 days.

(21) Appl. No.: 15/453,861

(22) Filed: Mar. 8, 2017

(65) Prior Publication Data
US 2018/0262348 A1    Sep. 13, 2018

(51) Int. Cl.
H04L 9/32    (2006.01)
H04L 9/08    (2006.01)
H04L 9/14    (2006.01)
H04L 29/06    (2006.01)

(52) U.S. Cl.
CPC .......... *H04L 9/3268* (2013.01); *H04L 9/0838* (2013.01); *H04L 9/14* (2013.01); *H04L 63/0823* (2013.01); *H04L 63/0884* (2013.01); *H04L 2209/76* (2013.01)

(58) Field of Classification Search
CPC ............. H04L 63/0823; H04L 63/0281; H04L 9/3263; H04L 9/3268; H04L 2209/76
See application file for complete search history.

(56) References Cited

U.S. PATENT DOCUMENTS

| | | | | |
|---|---|---|---|---|
| 2004/0008666 | A1* | 1/2004 | Hardjono | H04L 63/0823 370/352 |
| 2008/0148357 | A1* | 6/2008 | Chen | H04L 63/10 726/4 |
| 2009/0083537 | A1* | 3/2009 | Larsen | H04L 63/0281 713/153 |
| 2011/0258703 | A1* | 10/2011 | Ramcharran | H04L 63/0428 726/25 |
| 2012/0047571 | A1* | 2/2012 | Duncan | H04L 61/1511 726/13 |
| 2013/0291088 | A1* | 10/2013 | Shieh | H04L 63/0218 726/11 |
| 2015/0135299 | A1* | 5/2015 | Liang | H04L 12/6418 726/10 |
| 2016/0119374 | A1* | 4/2016 | Williams | H04L 63/1441 713/175 |
| 2017/0223054 | A1* | 8/2017 | Wing | H04L 63/166 |
| 2018/0145984 | A1* | 5/2018 | Duggal | H04L 63/10 |

OTHER PUBLICATIONS

HoWon Kim et al., "Design and Implementation of a Private and Public Key Crypto Processor and Its Application to a security System" IEEE, Feb. 2004, pp. 214-224, https://ieeexplore.ieee.org/stamp/stamp.jsp?tp=&arnumber=1277865 (Year: 2004).*

* cited by examiner

*Primary Examiner* — Jung W Kim
*Assistant Examiner* — Carlos M De Jesus Lassala
(74) *Attorney, Agent, or Firm* — Keith Kline; The Kline Law Firm PC

(57) ABSTRACT

Disclosed herein are systems and methods for a security gateway to process secure network sessions where there is a server certificate validation error. In various embodiments, varying security policies can be applied to the secure network sessions, including intercepting of network data, bypass of the security gateway, or termination of the secure sessions.

18 Claims, 12 Drawing Sheets

PROCESSING A SECURITY POLICY FOR CERTIFICATE VALIDATION ERROR

FIELD OF THE INVENTION

This invention relates generally to data networks and more particularly to a security gateway applying a security policy for a server certificate validation failure.

DESCRIPTION OF THE RELATED ART

Many service providers and corporates have policies to govern the use of digital computers and data networks, particularly policies for security and theft reasons. It is not uncommon for these business entities to inspect data communication used by a client device or a server device in their data network. Recent security network technologies and products even provide the businesses the ability to inspect data communication sessions that are encrypted. For example, an employee is browsing a secure website using a SSL session using his office computer. The employer installs a SSL intercept network appliance, which is capable of intercepting the SSL session between the employee office computer and the secure website. The SSL intercept network appliance provides a security session gateway between the secure website and the office computer. When the security network appliance receives a security certificate from the secure website, the security network appliance would generate a corporate issued certificate for the office computer such that the security network appliance is able to conduct a secure communication session with the office computer using the corporate issued certificate. The security network appliance conducts a separate secure communication session with the secure website using the website's security certificate. The security network appliance uses the two secure sessions to relay secure content exchanged between the office computer and the secure website, which the secure content is decrypted and inspected by the security network appliance in order to apply appropriate policies of the business entity. In the above scenario, the security network appliance is able to apply the necessary policies on behalf of the business entity.

It is not uncommon that the secure website changes or revokes its certificate for some reason. Under normal usage, the employee office computer would be aware of the change of state of the certificate in the absence of the security network appliance. However, in the usage scenario of a security network appliance, typically the security network appliance, when observing a change of status of the secure website's certificate, or failing to validate due to revocation of the certificate, chooses to deny the access by the office computer to the secure website. This one-size-fits-all denial of access often causes problems in many applications in the office computer. In some scenarios, the computer application, being aware of the certificate change, chooses to continue to communicate with the website. In other scenarios, the computer application alerts a user of a security certificate change. It is therefore appropriate for the security network appliance to provide different processes to handle certificate changes.

It should be apparent from the foregoing that there is a need to provide security policies to handle different failure reasons when a security gateway fails to validate a server certificate.

Further, in a typical secure network deployment scenario, a company or a service provider has security policies to inspect data transmitted over the network, including encrypted data transmitted over secure communicated sessions. Often, data over these secure sessions are encrypted using ciphers negotiated between clients and servers. A typical deployed security gateway in such secure data network negotiates different ciphers with the clients and the servers so that the security gateway decrypts received encrypted data for inspection according to the security policies, and encrypts the inspected data in order to forward the encrypted inspected data to the destination.

In order to improve processing performance, the security gateway usually employs a hardware based crypto module to perform the encryption and decryption processing. However, different ciphers have different resource and capacity requirement from the crypto module. When the security gateway serves a number of secure sessions, the usage of the crypto module varies from time and time. It is possible that the crypto module does not have the needed capacity or resource to support a new secure session received by the security gateway. Typically the security gateway would resort to software based encryption to service the new secure session, causing unnecessary processing delay to the new secure session since specialized hardware can process the session faster than this software. In another scenario, the security gateway adds the new secure session to the load of the crypto module, causing processing delay to currently active secure sessions handled by the crypto module. In either case, the resource exhaustion of the security gateway not only causes the new secure session and/or currently active secure sessions to suffer processing performance degradation, but also exposes the security gateway as a potential denial of service attacking point of the secure network.

In a different scenario, during negotiation of ciphers with a server, the server may choose a cipher not preferred or supported by the crypto module of the security gateway. Typically, the security gateway would resort to software encryption to handle the server chosen cipher, causing a similar resource exhaustion situation as mentioned above.

It should be apparent from the foregoing that there is a need to provide a method to allow a security gateway to dynamically allow bypass to a secure session, so as to avoid a resource exhaustion situation.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to some embodiments, the present technology is directed to a method for transmitting data from a client device to a server device via secure sessions with a security gateway device, the method comprising: establishing a first secure session between the client device and the security gateway; establishing a second secure session between the server device and the security gateway; retrieving a server certificate from the server device; and determining the validity of the retrieved server certificate by comparing the retrieved server certificate against a pre-stored certificate table at the security gateway.

According to other embodiments, the present technology is directed to a method for transmitting data from a client device to a server device via secure sessions with a security gateway device, the method comprising: receiving, at a security gateway, a session request from a client device to establish a secure session with a server device; establishing, at the security gateway, a first secure session with the client device; determining, by the security gateway, based on a security policy, to allow the requested session to bypass security examination; establishing, by the security gateway, a bypass secure session with the service device; and transmitting a plurality of data packets from the client device to the server device via the bypass secure session.

Other features, examples, and embodiments are described below.

BRIEF DESCRIPTION OF THE DRAWINGS

Embodiments are illustrated by way of example and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without department from the scope of what is claimed. The following detailed description is therefore not to be taken in a limiting sense, and the scope is defined by the appended claims and their equivalents.

Figure 1:
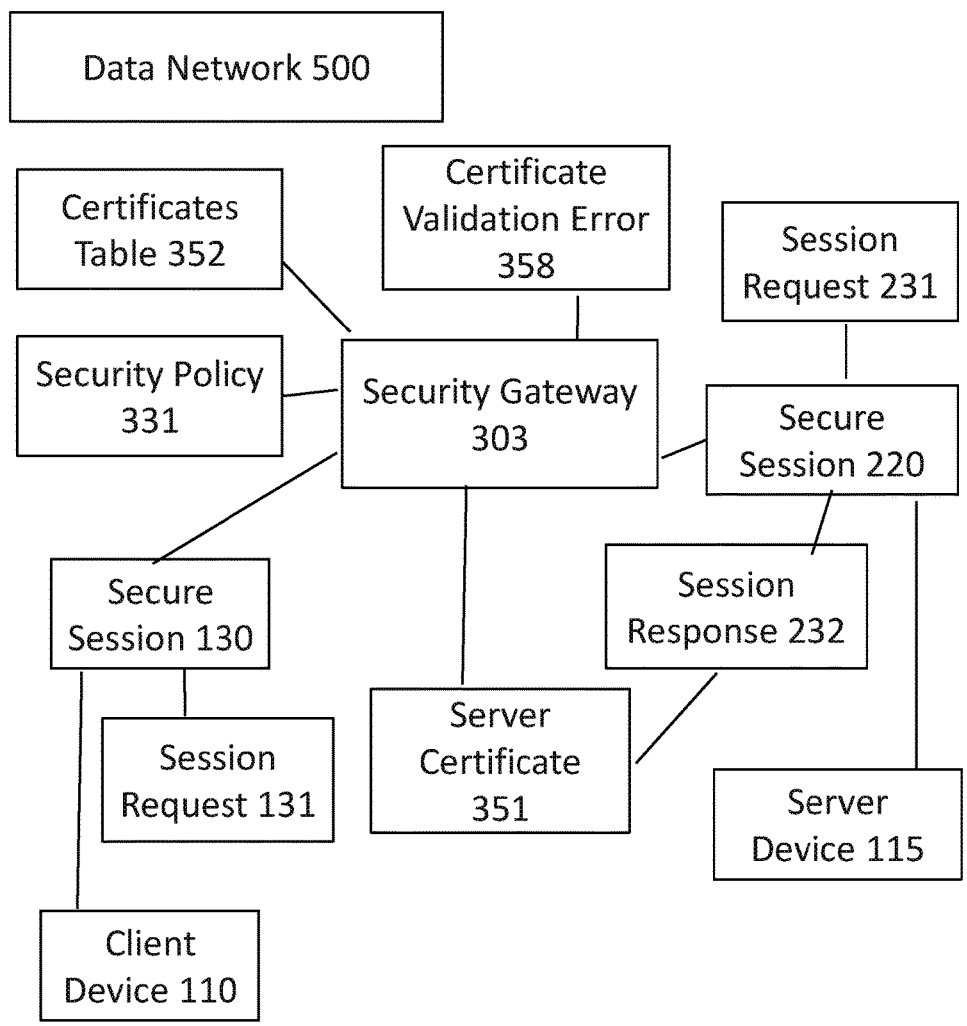
FIG. 1 illustrates an exemplary embodiment of a security gateway applying a security policy for failing to validate a server certificate.

FIG. 1 illustrates an exemplary embodiment of a security gateway processing a secure session between a client device and a server device, when the security gateway fails to validate a server certificate of the server device. Client device 110, security gateway 303 and server device 115 communicate over a data network 500. In the exemplary embodiment of FIG. 1, client device 110 communicates in a secure data session 130 with server device 115 via security gateway 303. In one embodiment, security gateway 303 intercepts secure session 130, and establishes another secure session 220 between client device 110 and server device 115. In one embodiment, security gateway 303 receives a secure session request packet 131 from client 110 over secure session 130. Security gateway 303 generates a secure session request 231 packet based on session request 131, and sends session request 231 packet to server device 115 over secure session 220. Upon processing received session request 231 packet, server device 115 responds with a server certificate 351 in a session response 232 packet, and sends session response 232 packet over secure session 220 to security gateway 303.

In one embodiment, security gateway 303 obtains server certificate 351 from session response 232 and validates server certificate 351. In one embodiment, security gateway 303 includes certificate table 352 and uses certificate table 352 to validate server certificate 351. In one embodiment, security gateway 303 fails to validate server certificate 351, and determines a certificate validation error 358. Security gateway 303 selects a security policy 331 based on certificate validation error 358, server certificate 351 and session request 131, and applies security policy 331 to secure session 130 with client device 110.

In one embodiment, which will be further illustrated in more detail in subsequent illustrations, security gateway 303, according to security policy 331, may deny secure session request 131 and discontinue secure session 130 with client device 110 and secure session 130 with server device 115 in response to certificate validation error 358. In another exemplary embodiment of security policy 331, security gateway intercepts secure session 130 and secure session 220, examines, by decryption and inspection, secure content received over secure session 130 and secure session 220, and forwards by encrypting the examined secure content to client device 110 or server device 115 accordingly. For inspection, the secure content may be decrypted and/or encrypted using a symmetric session key, the symmetric session key being derived based on parameters exchanged during a handshake to initiate a connection. In exemplary embodiments, public and/or private keys may be used during the handshake process to derive the symmetric session key. Decrypting the secure content can occur using the symmetric session key derived from a handshake with the client device and the generated gateway certificate. After inspection, encrypting of the secure content can occur using the symmetric session key derived from a handshake with the server device 115 and the server certificate.

In a further exemplary embodiment of security policy 331, security gateway 303 may permit a dynamic security bypass so that the secure content communicated between client device 110 and server device 115 is not examined by security gateway 303.

Figure 2:
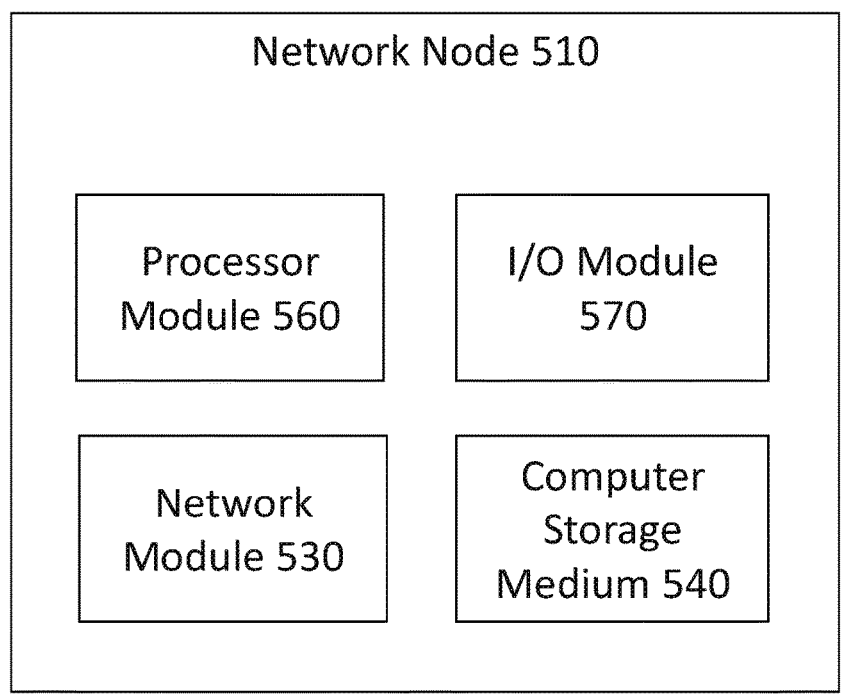
FIG. 2 illustrates a network node.

FIG. 2 illustrates an exemplary network node 510 or a network computer which can be a security gateway 303, a client device 110 or a server device 115. In various embodiments, network node 510 includes a processor module 560, a network module 530, and a computer storage module 540. Processor module 560 comprises one or more processors which may be a micro-processor, an Intel processor, an AMD processor, a MIPS processor, an ARM-based processor, or a RISC processor. Processor module 560 can include one or more processor cores embedded in a processor, one or more embedded processors, or embedded processing elements in a Field Programmable Gate Array (FPGA), an Application Specific Integrated Circuit (ASIC), or Digital Signal Processor (DSP).

In one embodiment, network module 530 comprises a network interface such as Ethernet, optical network interface, a wireless network interface, T1/T3 interface, a WAN or LAN interface. In one embodiment, network module 530 includes a network processor.

Computer storage medium 540 comprises RAM, DRAM, SRAM, SDRAM or memory utilized by processor module 560 or network module 530. Computer storage medium 540 can store data utilized by processor module 560. Computer storage medium 540 may include a hard disk drive, a solid state drive, an external disk, a DVD, a CD, or a readable external disk. Computer storage medium 540 stores one or more computer programming instructions which when executed by processor module 560 or network module 530 implement one or more of the functionality of this present disclosure. In various embodiments network node 510 may also include an input/output (I/O) module 570, which may include a keyboard, a keypad, a mouse, a gesture based input sensor, a microphone, a physical or sensory input peripheral, a display, a speaker, or a physical or sensual output peripheral.

Returning to FIG. 1, in one embodiment, client device 110 is a network node, as illustrated in FIG. 2, connected to data network 500. Client device 110 can be a personal computer, a laptop computer, a tablet, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device comprising at least a network module and a processor module.

In one embodiment, server device 115 is a server network computer connected to data network 500. Server device 115 serves secure session 130 requested indirectly by client device 110 via security gateway 303. In one embodiment, secure session 130 includes a service session such as a HTTP session, a file transfer session, a remote access session, a FTP session, a voice over IP session, a SIP session, a video or audio streaming session, an e-commerce session, an enterprise application session, an email session, an online gaming session, a teleconference session, or a Web-based communication session. In one embodiment, secure session 130 includes a service session with security such as a SSL session, a TLS session, an IPSec session, a secure TCP session, a secure Web session, a secure VPN session, a secure voice over IP session, a secure video or audio streaming session, a secure conferencing session, a secure document access session, a secure network access session, a secure e-commerce session, a secure business-to-business transaction session, a secure financial transaction session, a secure collaboration session, or a secure on-line game session. In one embodiment, secure session request 131 includes a request message for a SSL session, a TLS session, an IPSec session, a secure TCP session, or a request message specified in a secure session protocol used by client device 110.

In one embodiment, security gateway 303 is a network node and includes one or more of functionality of a firewall, a SSL proxy gateway, a server load balancer (SLB), an application delivery controller (ADC), a threat protection system (TPS), a secure traffic manager, a legal interception gateway, a virtual private network (VPN) gateway, or a TCP proxy gateway. In one embodiment, security gateway 303 includes one or more hardware security modules such as a hardware-based crypto module or a hardware-based encryption engine. In one embodiment, security gateway 303 includes a security system including one or more network nodes and a data network, where one network node processes secure session 130 with client device 110 and one network node processes secure session 220 with server device 115. In one embodiment, security gateway 303 includes a security application to process decrypted intercepted secure session data traffic. The security application may include virus detection, credit card fraud, document or identity theft, session recording, cyber-attack detection, company security policy processing, or government security policy or compliant processing.

In various embodiments, server certificate 351 is a security certificate, such as an Internet security certificate, an SSL certificate, a Certification Authority (CA) certificate, a corporate issued security certificate, a network generated security certificate, a trusted security certificate, a user certificate, or any digital security certificate used between peers of a secure data communication session. Server certificate 351 can include a digital signature, a key for encryption and decryption, a cipher method, and/or an identity.

In various embodiments, data network 500 comprises an Ethernet network, an ATM network, a cellular network, a wireless network, a Frame Relay network, an optical network, an IP network or any data communication network utilizing other physical layer, link layer capability or network layer to carry data packets. Data network 500 can include a corporate network, a data center network, the Internet, a service provider network, or a mobile operator network.

Figure 3:
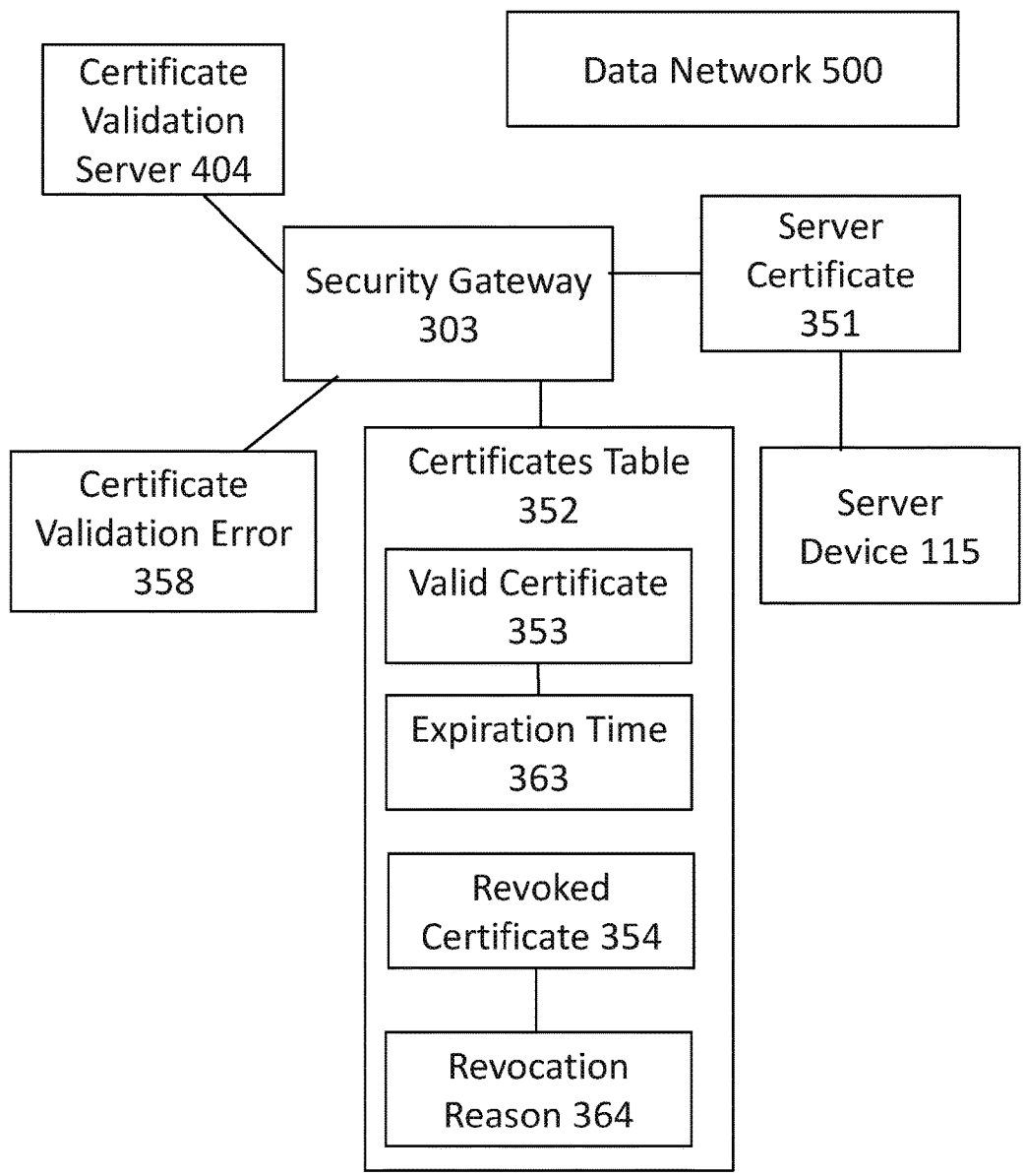
FIG. 3 illustrates an exemplary embodiment process of validating a server certificate.

FIG. 3 illustrates an exemplary process for security gateway 303 to validate server certificate 351 obtained from a server device. In one embodiment, security gateway 303 receives server certificate 351 from server device 115. Security gateway 303 determines if server certificate 351 is valid, based on comparison with a pre-stored certificate table 352. Security gateway 303 matches server certificate 351 against certificate table 352 to determine a matching valid certificate 353 entry or a matching revoked certificate 354 entry. In one embodiment, server certificate 351 includes a certificate identity, which may include an SNI (Server Name Indication), a server name, a hostname, a wildcard name, or a string of characters. Security gateway 303 matches certificate identity of certificate 351 against certificate table 352 to determine a matching entry.

In one embodiment, security gateway 303 determines valid certificate 353 of certificate table 352 matches server certificate 351. In one embodiment, valid certificate 353 includes an expiration time 363. Security gateway 303 checks if the current time, using a clock (not shown) coupled to security gateway 303, exceeds the expiration time 363. In one embodiment, security gateway 303 determines certificate 353 has not expired, and determines server certificate 351 is valid. In one embodiment, security gateway 303 determines expiration time 363 has passed, and determines that server certificate 351 fails to be validated. Security gateway 303 indicates in certificate validation error 358 an indication of validation failure due to certificate expiration.

In one embodiment, security gateway 303 determines a revoked certificate 354 of certification table 352 matches server certificate 351. Security gateway 303 includes in certificate validation error 358 an indication of validation failure due to certificate revocation. In one embodiment, revoked certificate 354 includes a revocation reason 364, and security gateway 303 includes the revocation reason 364 into certificate validation error 358.

In one embodiment, security gateway 303 determines both a matching valid certificate 353 and a matching revoked certificate 354. Security gateway 303 examines expiration time 363 of valid certificate 353 and includes an expiration or non-expiration indication into certificate validation error 358. Security gateway 303 further includes a certificate revocation failure indication and optionally revocation reason 364 of revoked certificate 354 into certificate validation error 358. In various embodiments, security gateway 303 may ignore the revoked certificate 354 and process the session through a proxy, such as SSL proxy, when the server certificate is still valid.

In one embodiment, security gateway 303 does not find a matching entry from certificate table 352. In one embodiment, security gateway 303 communicates with a networked certificate validation server 404 to validate server certificate 351. In one embodiment, security gateway 303 sends server certificate 351 or certificate identity of server certificate 351 to certificate validation server 404. In one embodiment, security gateway 303 receives from certificate validation server 404 a valid certificate 353 or a revoked certificate 354 for server certificate 351. In one embodiment, certificate validation server 404 sends to security gateway 303 revoked certificate 354 matching server certificate 351 prior to security gateway 303 receiving server certificate 351 from server device 115 over secure session 220. In one embodiment, security gateway 303 stores received valid certificate 353 and/or revoked certificate 354 into certificate table 352. In one embodiment, security gateway 303 uses received valid certificate 353 and/or revoked certificate 354 to validate server certificate 351 as described earlier.

In various embodiments, networked certificate validation server 404 may be a server in communication with Certificate Revocation Lists (CRL) or Online Certificate Status Protocol (OCSP), as known to those of ordinary skill in the art.

Figure 4:
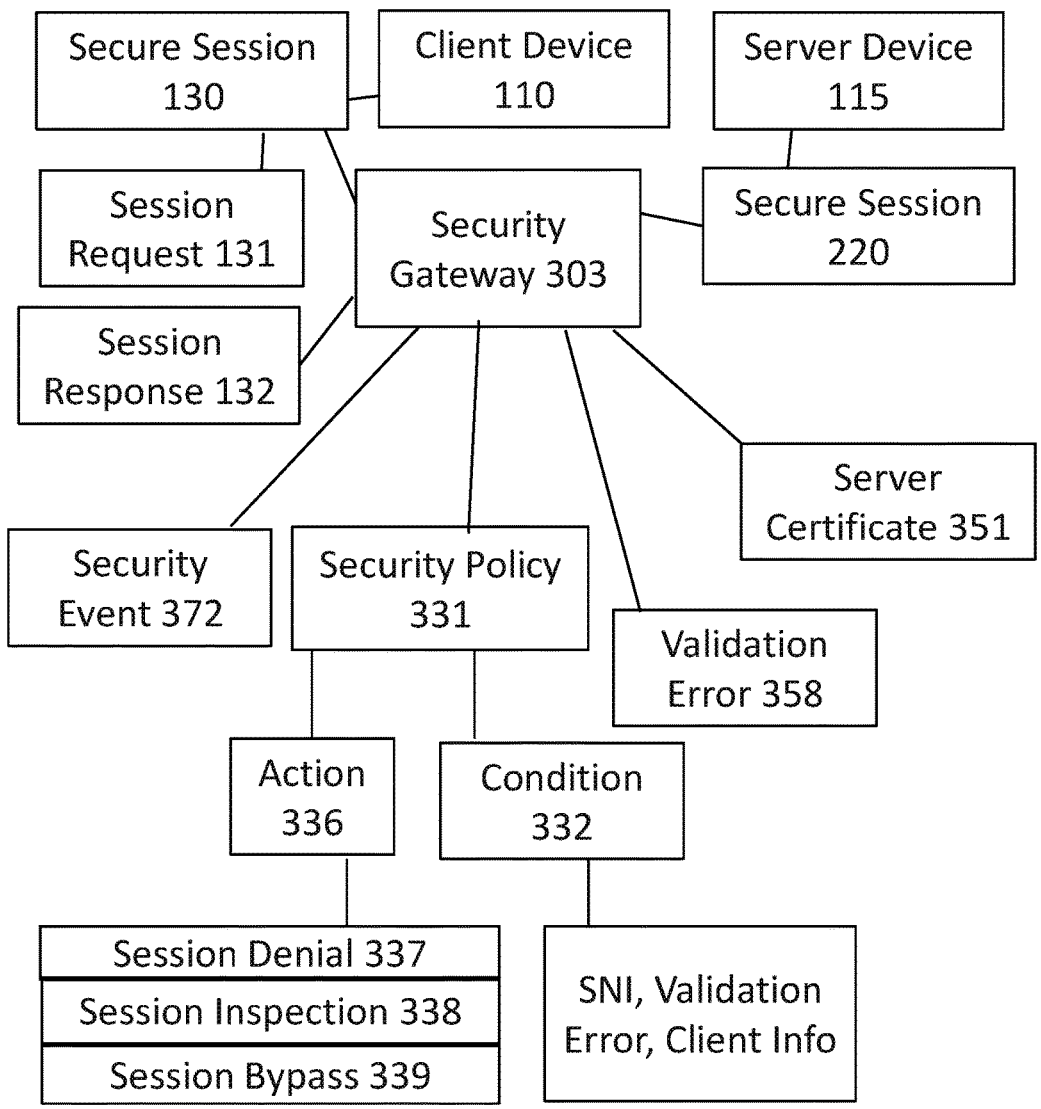
FIG. 4 illustrates an exemplary embodiment process of applying a security policy for a certificate validation error.

FIG. 4 illustrates an exemplary process for security gateway 303 to apply security policy 331. In one embodiment, security gateway 303 determines from certification validation error 358 that server certificate 351 is not valid. Security gateway 303 selects and applies a matching security policy 331 to secure session 130 with client device 110. There can be any number of security policies that service gateway 303 can apply to secure session 130 and/or secure session 220, ranging from strong security to loose security. Additionally, the security policy can be configured per SNI, client, validation error reason, or based on any other factor.

Security policy 331 includes a condition 332 and an action 336. Condition 332 may include one or more of an SNI, one or more validation error indications, and client device information such as client device network address. In one embodiment, security gateway 303 obtains appropriate data from server certificate 351 such as SNI, one or more indications from certificate validation error 358 and data about client device 110 from secure session 130. Security gateway 303 matches the obtained data to condition 332 of security policy 331 to determine security policy 331 is a match. In various embodiments, the condition 332 and action 336 for the security policy 331 may be predesignated by a user or network administrator. The security policy 331 may also be based on a location of where the security gateway 303 is deployed.

In one embodiment, security gateway 303 determines security policy 331 is a match. Security gateway 303 applies action 336 of security policy 331. In one embodiment of a strong security policy 331, action 336 indicates an action of session denial 337. In applying the action of session denial 337, security gateway 303 disconnects secure session 220 with server device 115 and secure session 130 with client device 110. In one embodiment, secure session 130 or secure session 220 includes a TCP session, and security gateway 303 disconnects or resets the TCP session for secure session 130 or secure session 220. In one embodiment, security gateway 303 sends a session response 132 packet to session request 131 to indicate an error and to terminate secure session 130. In one embodiment, session response 132 includes an SSL Alert message or SSL Hello message with the error indication.

In one embodiment, action 336 indicates an action of session inspection 338. In applying the action of session inspection 338, security gateway 303 considers server certificate 351 to be valid, and proceeds to perform security interception of secure session 130 and secure session 220. In one embodiment, security gateway 303 generates a gateway certificate using server certificate 351, and responds affirmatively to session request 131 using the generated gateway certificate. Subsequently, in one embodiment, security gateway 303 receives secure content from client device 110 over secure session 130, decrypts the secure content using a private key in the generated gateway certificate, inspects the decrypted secure content, encrypts the decrypted secure content using a public key associated to server certificate 351, and sends the encrypted content over secure session 220 to server device 115. The inspection process may utilize a symmetric session key to decrypt and encrypt the secure content.

In one embodiment, security gateway 303 receives secure content from server device 115 over secure session 220, decrypts the secure content using a private key in the server certificate 351, inspects the decrypted secure content, encrypts the decrypted secure content using a public key associated to the generated gateway certificate, and sends the encrypted content over secure session 130 to client device 110. In one embodiment, security gateway 303 applies one or more other security measures or policies during the inspection process. In one embodiment, secure session 130 or secure session 220 includes an SSL session, SSL proxy, or IPSec session. Security gateway 303 performs SSL or IPSec interception processing between secure session 130 with client device 110 and secure session 220 with server device 115. This security policy 331 allows some client application processing with server device 115.

Figure 5:
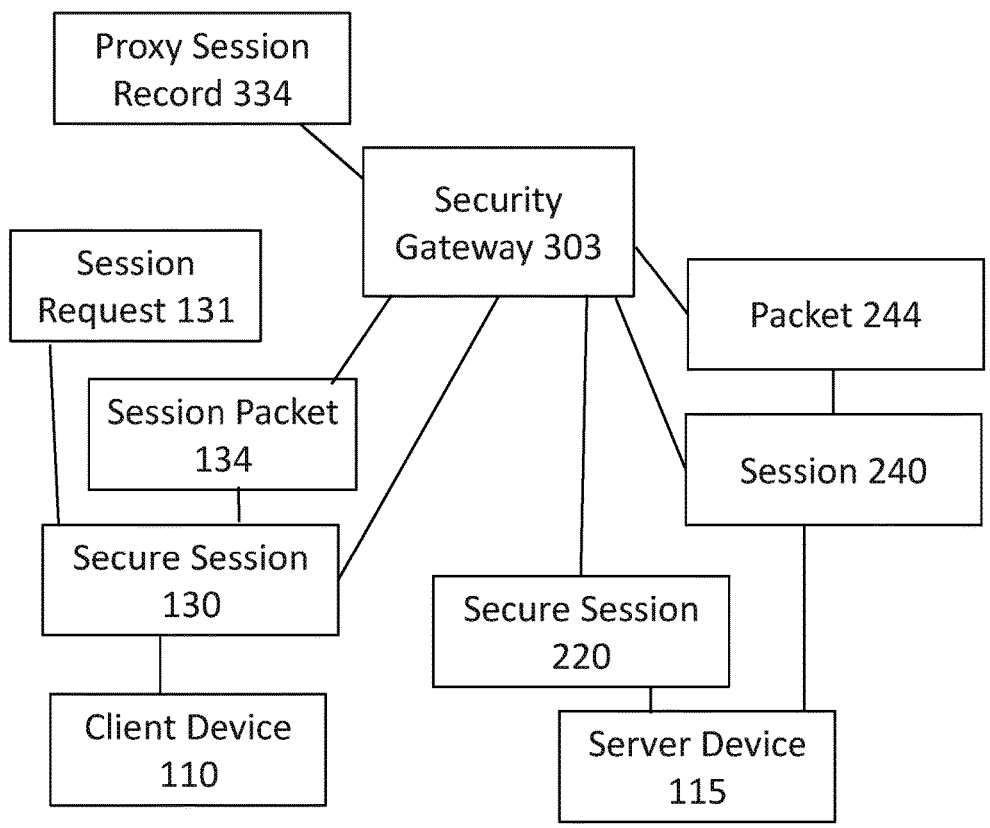
FIG. 5 illustrates an exemplary embodiment process of a session proxy.

In an example of a loose security policy, action 336 indicates an action of session bypass 339. The revocation of the security certificate is honored, but a bypass session is created such that the server device 115 and client device can communicate directly, allowing the client device to decide if the communications are secure enough or not. FIG. 5 illustrates an exemplary embodiment of a session bypass process performed by security gateway 303. In one embodiment, security gateway 303 disconnects secure session 220 with server device 115, and establishes a data session 240 with server device 115, and applies a session proxy processing between secure session 130 and data session 240, to allow direct client-server secure session through a proxy such as TCP proxy. In one embodiment, secure session 130 and data session 240 are TCP sessions. Security gateway 303 performs TCP proxy functions between secure session 130 and data session 240.

In one embodiment, security gateway 303 receives a session packet 134 from secure session 130, including session request 131 packet, obtains the payload from the received session packet 134, generates a session packet 244, containing the obtained payload, for session 240, and sends the generated session packet 244 over session 240 to server device 115. In one embodiment, security gateway 303 receives a session packet 244 from session 240, obtains the payload from the received session packet 244, generates a session packet 134, containing the obtained payload, for secure session 130, and sends the generated session packet 134 over secure session 130 to client device 110. In one embodiment, secure session 130 and data session 240 are TCP sessions. Session packet 134 and session packet 244 are TCP packets over the corresponding secure session 130 and data session 240.

In one embodiment, security gateway 303 generates a proxy session record 334, relating session 240 and secure session 130, so as to assist the session proxy processing between session 240 and secure session 130. In one embodiment, proxy session record 334 includes an indication linking to validation error 358 illustrated in FIG. 4.

Returning to FIG. 4, in one embodiment, security gateway 303 generates a security event 373 according to the processing of certification validation error 358 and security policy 331. Security event 372 may include information about security policy 331, action 336 taken, condition 332 being matched, server certificate 351, validation error 358, client device 110 information, server device 115 information, time of generation of security event 372, and information about security gateway 303.

Table 1 illustrates an exemplary list of certificate revocation reasons.

TABLE 1

Certificate Revocation Reasons unspecified
keyCompromise
CACompromise
affiliationChanged
superseded
cessationOfOperation
certificateHold
privilegeWithdrawn
AACompromise Considering exemplary revocation reasons in Table 1, security policy 331 may have condition 332 specifying an SNI, a revocation error with a revocation reason of "certificateHold", and a non-expiration indication, and action 336 indicating session inspection 338. Security policy 331 may have condition 332 specifying the same SNI and a revocation error with a revocation reason of one of "Compromise" reasons, and action 336 indicating session denial 337. In one embodiment, security policy 331 may have condition 332 specifying any SNI, a revocation error with a revocation reason of keyCompromise, and a non-expiration indication, and action 336 specifying session denial 337. In one embodiment, security policy 331 has condition 332 specifying an SNI of a corporate website, a revocation error, and a non-expiration indication, and action 336 specifying session bypass 339. In one embodiment, security policy 331 may have condition 332 specifying an SNI, a revocation error and an expiration indication, and action 336 indicating session bypass 339. The action of session bypass 339 is to not inspect the secure content of the secure session between client device 110 and server device 115.

In one embodiment, security policy 331 is pre-stored or pre-configured on security gateway 303. In one embodiment, security gateway 303 allows security policy 331 to be updated. In one embodiment, security gateway 303 receives security policy 331 from a networked computer in communication with security gateway 303.

Figure 6:
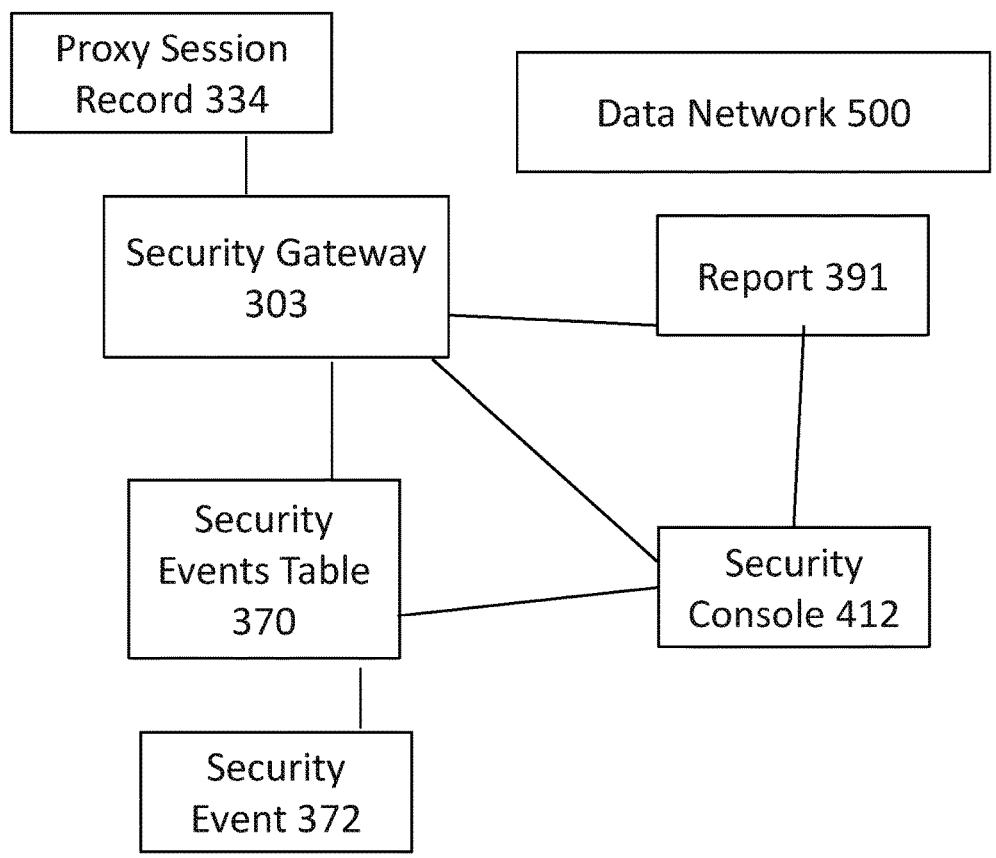
FIG. 6 illustrates an exemplary embodiment of generating a security report.

FIG. 6 illustrates an exemplary process of generating security reports. In one embodiment, security gateway 303 stores security event 372 into a security events table 370. In one embodiment, security gateway 303 stores security events table 370 in a storage module such as computer storage medium 540 of FIG. 2. In one embodiment, security gateway 303 sends security event 372 or security events table 370 to a security console 412, which is a networked computer over data network 500. In one embodiment, security gateway 303 or security console 412 generates a security report 391 using security events table 370. In one embodiment, security report 391 is generated by one or more criteria based on server device information, server certificate information such as SNI, client device information, a security policy, a revocation reason, a security policy action, and a certificate validation error. In one embodiment, report 391 is displayed onto a display coupled to security gateway 303 or security console 412.

In one embodiment, security gateway 303 stores proxy session record 334 in report 391. In one embodiment, security gateway 303 displays proxy session record 334 onto a display coupled to security console 412. In one embodiment, security gateway 303 includes proxy session record 334 information in security event 372.

Figure 7:
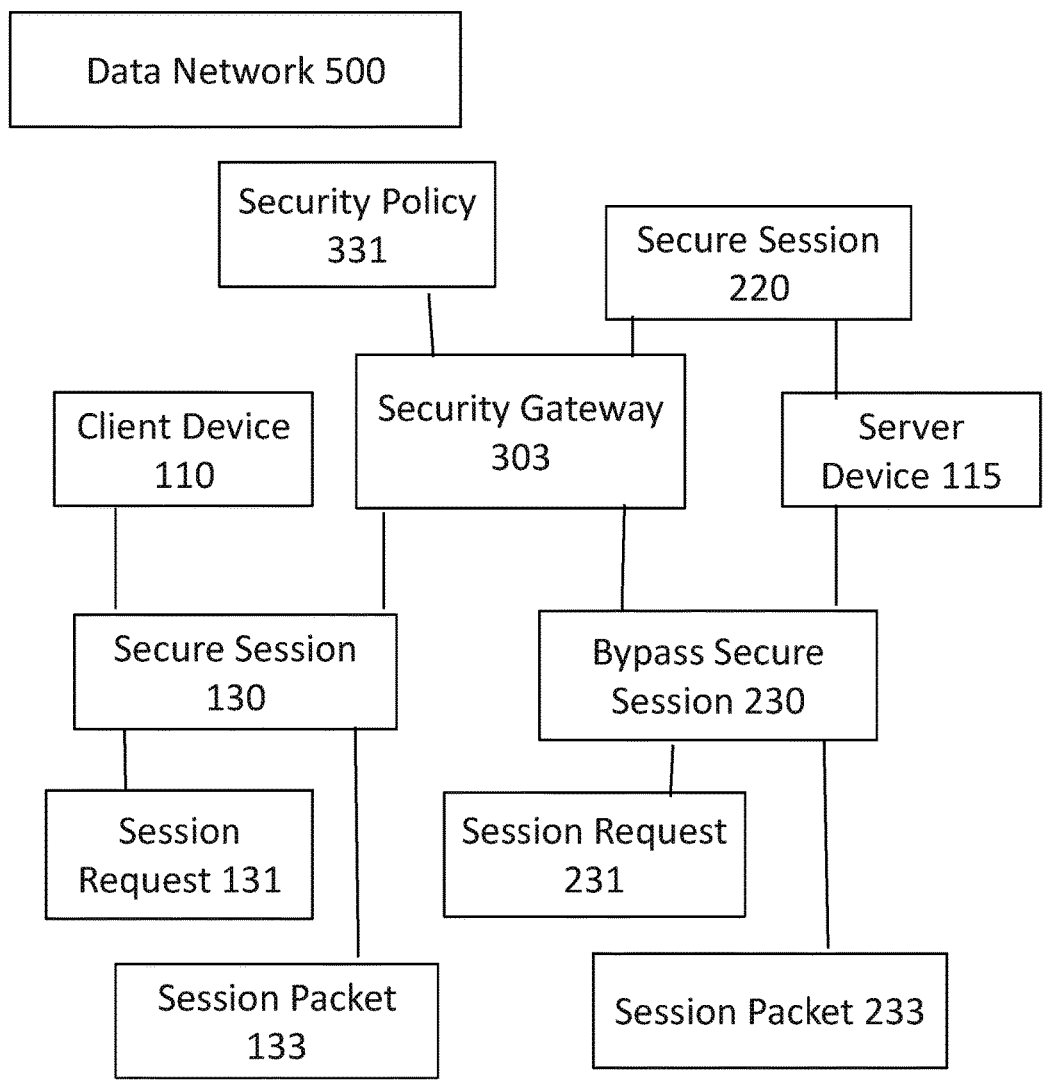
FIG. 7 illustrates an exemplary embodiment of a security gateway providing a dynamic bypass to an intercepted secure session.

FIG. 7 illustrates an exemplary embodiment of a dynamic bypass secure session between a client device 110 and a server device 115, allowed via a security gateway 303. In this embodiment, client device 110 communicates in a secure data session 130 with server device 115 via security gateway 303. In one embodiment, security gateway 303 intercepts secure session 130, establishes another secure session 220 with server device 115, receives session packet 133 of secure session 130, examines session packet 133 and forwards session packet 133 to server device 115.

In one embodiment, security gateway 303 receives a session request 131 from client device 115 to establish secure session 130. In response to processing session request 131, security gateway 303 attempts to establish a secure session 220 with server device 115. In one embodiment, security gateway 303 determines, based on security policy 331 and a response regarding secure session 220 from server device 115, to allow secure session 130 to bypass security examination. Security gateway 303 then establishes a bypass secure session 230 with server device 115 by sending a session request 231 packet to server device 115. Session request 231 is generated by security gateway 303 based on session request 131. Upon establishing bypass secure session 230, security gateway 303 relays subsequently received session packet 133 from client device 115 as session packet 233 through bypass secure session 230 to server device 115. In the reverse traffic direction, security gateway 303 receives session packet 233 from server device 115 over bypass secure session 230, and relays session packet 233 as session packet 133 over secure session 130 to client device 110. In these embodiments, security gateway 303 relays received session packets without decrypting the received session packets.

In one embodiment, secure session 130 is conducted over a TCP/IP session. Security gateway 303 establishes a TCP/IP session for bypass secure session 230 and performs a TCP proxy gateway functionality between secure session 130 and bypass secure session 230. In TCP proxy gateway functionality, one TCP connection can become many TCP connections. In one embodiment, security gateway 303 relays session packet 133 received from secure session 130 as session packet 233 by applying TCP proxy processing, without applying security processing, such as decryption or encryption, to session packet 133, and sends session packet 233 over bypass secure session 230. In one embodiment, security gateway 303 relays session packet 233 received from bypass secure session 230 as session packet 133 by applying TCP proxy processing, without applying security processing, such as decryption or encryption, to session packet 233, and sends session packet 133 over secure session 130.

In the exemplary embodiment depicted in FIG. 7, client device 110 is a network node, such as that illustrated in FIG. 2, connected to data network 500. Client device 110 can be a personal computer, a laptop computer, a tablet, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device comprising at least a network module and a processor module.

In one embodiment, server device 115 is a server network computer connected to data network 500. Server device 115 serves secure session 130 requested indirectly by client device 110 via security gateway 303. In one embodiment, secure session 130 includes a service session such as a HTTP session, a file transfer session, a remote access session, a FTP session, a voice over IP session, a SIP session, a video or audio streaming session, an e-commerce session, an enterprise application session, an email session, an online gaming session, a teleconference session, or a Web-based communication session. In one embodiment, secure session 130 includes a service session with security such as a SSL session, a TLS session, an IPSec session, a secure TCP session, a secure Web session, a secure VPN session, a secure voice over IP session, a secure video or audio streaming session, a secure conferencing session, a secure document access session, a secure network access session, a secure e-commerce session, a secure business-to-business transaction session, a secure financial transaction session, a secure collaboration session, or a secure on-line game session.

In one embodiment, security gateway 303 is a network node and includes one or more of functionality of a firewall, a SSL proxy gateway, a server load balancer (SLB), an application delivery controller (ADC), a threat protection system (TPS), a secure traffic manager, a legal interception gateway, a virtual private network (VPN) gateway, or a TCP proxy gateway. In one embodiment, security gateway 303 includes one or more hardware security modules such as a hardware-based crypto module or a hardware-based encryption engine. In one embodiment, security gateway 303 includes a security system including one or more network nodes and a data network, where one network node processes secure session 130 with client device 110 and one network node processes secure session 220 with server device 115. In one embodiment, security gateway 303 includes a security application to process decrypted intercepted secure session data traffic. The security application may include virus detection, credit card fraud, document or identity theft, session recording, cyber-attack detection, company security policy processing, or government security policy or compliant processing.

In one embodiment, data network 500 includes an Ethernet network, an ATM network, a cellular network, a wireless network, a Frame Relay network, an optical network, an IP network or any data communication network utilizing other physical layer, link layer capability or network layer to carry data packets. In one embodiment, data network 500 includes a corporate network, a data center network, the Internet, a service provider network, or a mobile operator network.

Figure 8:
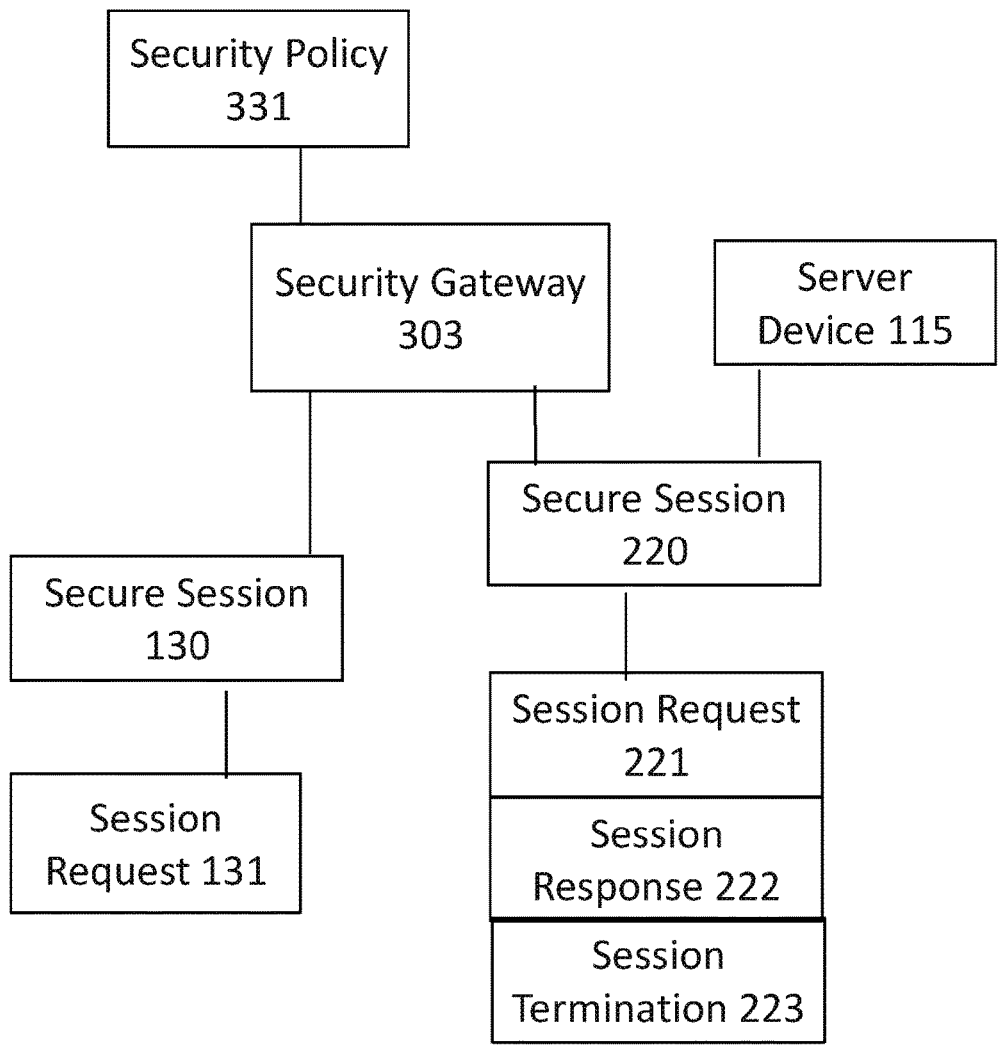
FIG. 8 illustrates an exemplary embodiment of dynamically determining a bypass for secure session.

FIG. 8 illustrates an exemplary embodiment of a process to establish a secure session 220 between security gateway 303 and server device 115 according to secure session 130. In one embodiment, security gateway 303 receives session request 131 of secure session 130. Security gateway 303 generates a session request 221 from session request 131. In one embodiment, security gateway 303 selects a security policy 331 for secure session 130 and uses security policy 331 and session request 131 to generate session request 221. In one embodiment, security gateway 303 uses information in session request 131 to select security policy 331. Security gateway 303 sends session request 221 to server device 115 in order to establish secure session 220.

Figure 9:
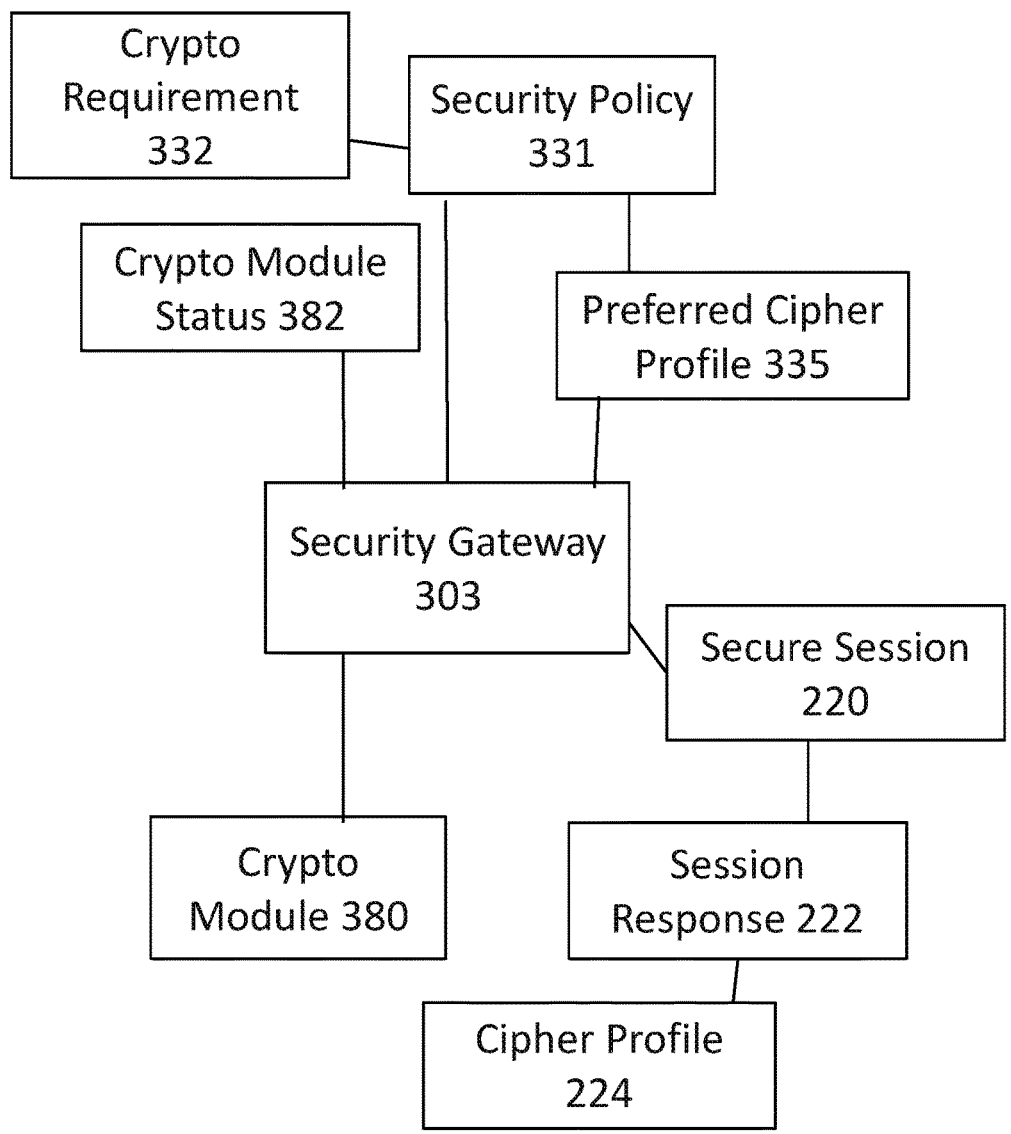
FIG. 9 illustrates an exemplary embodiment of applying a security policy to determine a bypass.

In one embodiment, security gateway 303 receives a session response 222 from server device 115, as a response to session request 221. As illustrated in an exemplary embodiment in FIG. 9, security gateway 303 examines session response 222. In one embodiment, session response 222 indicates no error and security gateway 303 proceeds to prepare resources to establish secure session 220. In one embodiment, security gateway 303 includes a crypto module 380. Security gateway 303 examines a crypto module status 382 and security policy 331 to determine if sufficient resource of crypto module 380 can be allocated for secure session 220 and secure session 130. In one embodiment, crypto module status 382 indicates one or more status of crypto module 380, such as a usage status, number of active secure sessions, current usage percentage, availability percentage, usage status per security priority class, usage status per cryptography class, or other status.

In one embodiment, security policy 331 indicates a cryptographic resource requirement 332 for secure session 220 that includes one or more of a cryptography usage requirement, cryptography availability requirement, a security priority class, a quality of service requirement, or other service policy for secure session 220. In one embodiment, security gateway 303 compares security policy 331 and crypto module status 382 and determines crypto module status 382 does not satisfy security policy 331. In one embodiment, crypto module status 382 usage status is below the resource requirement of security policy 331, or availability status of a security priority class in crypto module status 382 is below the resource requirement in security policy 331, or usage availability of the cryptography class in crypto module status 382 is below the resource requirement in security policy 331. In one embodiment, crypto module status 382 indicates an error status of crypto module 380. In one embodiment, security gateway 303 determines secure session 220 cannot be successfully established based on the crypto module status 382.

In one embodiment, session response 222 includes an error or exception indication in a cipher negotiation, including a cipher profile 224. In one embodiment, security policy 331 includes a preferred cipher profile 335 for secure session 220. Cipher profile 335 may include one or more cipher suites such as DH-RSA-RC4-SHA1, RSA-AES-SHA256, DHE-RSA-AES-SHA, RSA-AES-SHA128, RSA-3DES-SHA256, or other ciphers. In one embodiment, security gateway 303 includes preferred cipher profile 335 in session request 221. In one embodiment, session response 222 includes a cipher alert indicating an error, or a cipher profile 224 not in preferred cipher profile 335. In one embodiment, session response 222 includes one or more data packets exchanged between security gateway 303 and server device 115 in negotiating a cipher. In one embodiment, session response 222 indicates an error in negotiating a cipher. Security gateway 303 determines secure session 220 cannot be successfully established.

In one embodiment, session response 222 indicates an error and security gateway 303 determines secure session 220 cannot be successfully established. In one embodiment, secure session 220 includes a TCP session and session response 222 indicates an error of the TCP session, which may be receiving a TCP reset message from server 115, a re-transmission situation of the TCP session, or a TCP/IP layer error situation for secure session 220. In one embodiment, secure session 220 includes an SSL session and session response 222 indicates version compatibility error for the SSL session. In this embodiment, security gateway 303 includes a version number for the SSL session into session request 221 based on an SSL version number obtained from the secure request 131 illustrated in FIG. 8.

Returning to FIG. 8, upon determining secure session 220 cannot be successfully established, security gateway 303 sends a session reset 223 packet to server device 115 to terminate secure session 220. In one embodiment, secure session 220 includes a TCP session and session reset 223 packet is used to terminate the TCP session.

In one embodiment, upon terminating secure session 220, security gateway 303 proceeds to establish bypass secure session 230 as in FIG. 7.

Figure 10:
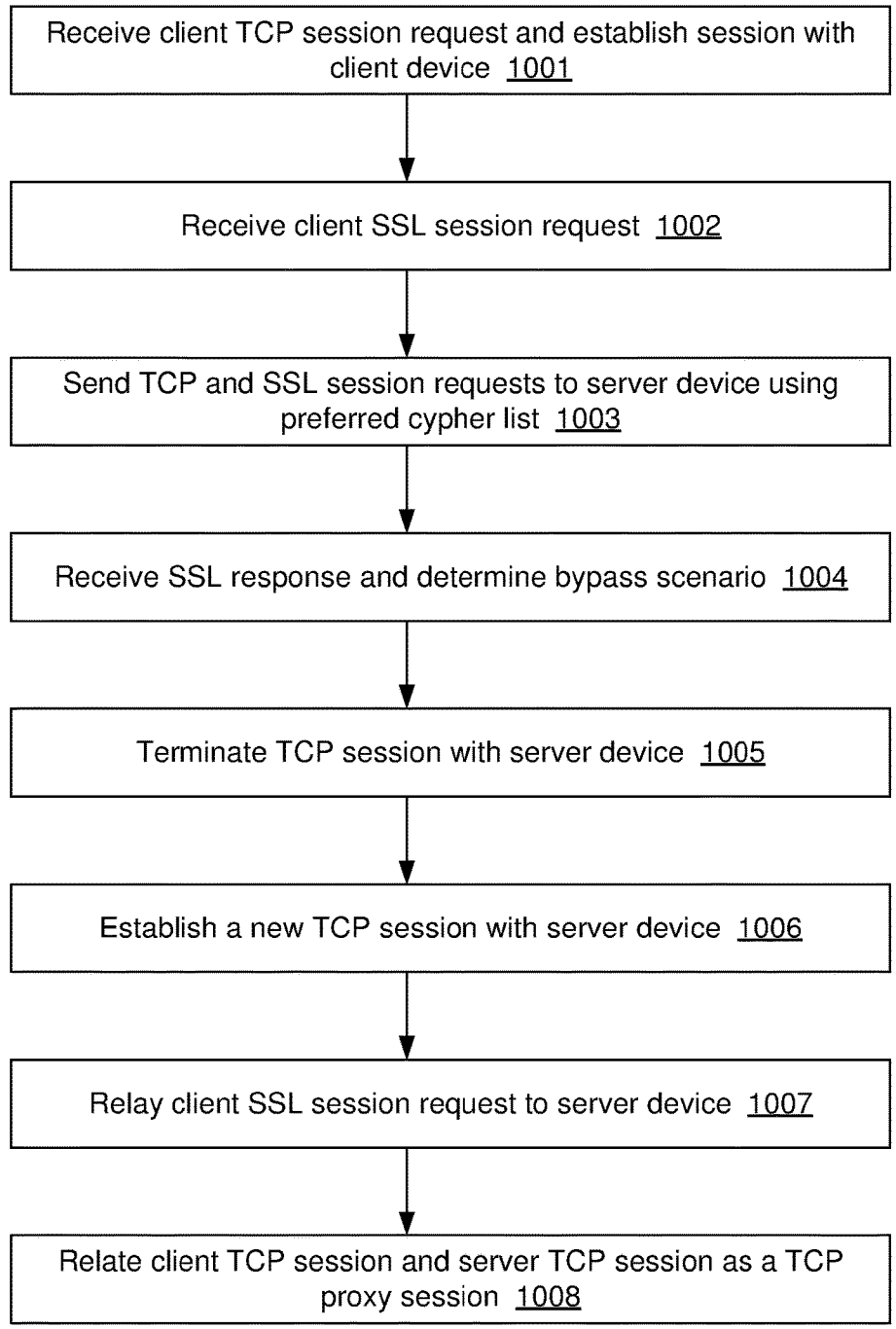
FIG. 10 illustrates an exemplary method for processing an SSL intercept by a security gateway.

FIG. 10 illustrates an exemplary method for processing an SSL intercept by a security gateway 303. While the method is presented herein in discrete steps, various steps of the method may be performed in varying orders or omitted in exemplary embodiments.

In step 1001, security gateway 303 receives a client TCP session request and establishes a TCP session with client device 110. The security gateway 303 further receives a client SSL session request in step 1002 for a secure session. Security gateway 303 sends the TCP and SSL session requests to server device 115 using a preferred cipher list in step 1003. A SSL response is received from server device 115 in step 1004, and security gateway determines that a bypass session is needed. In step 1005, security gateway 303 terminates an existing TCP session with server device 115 and establishes a new TCP session with server device 115 in step 1006. The client SSL session request is relayed to server device 115 in step 1007. Finally, the client TCP session and server TCP session are related as a TCP proxy session in step 1008.

While the present disclosure refers to TCP sessions and TCP proxy sessions, it will be understood by a person of ordinary skill in the art that another protocol other than TCP may also be used.

Figure 11A:
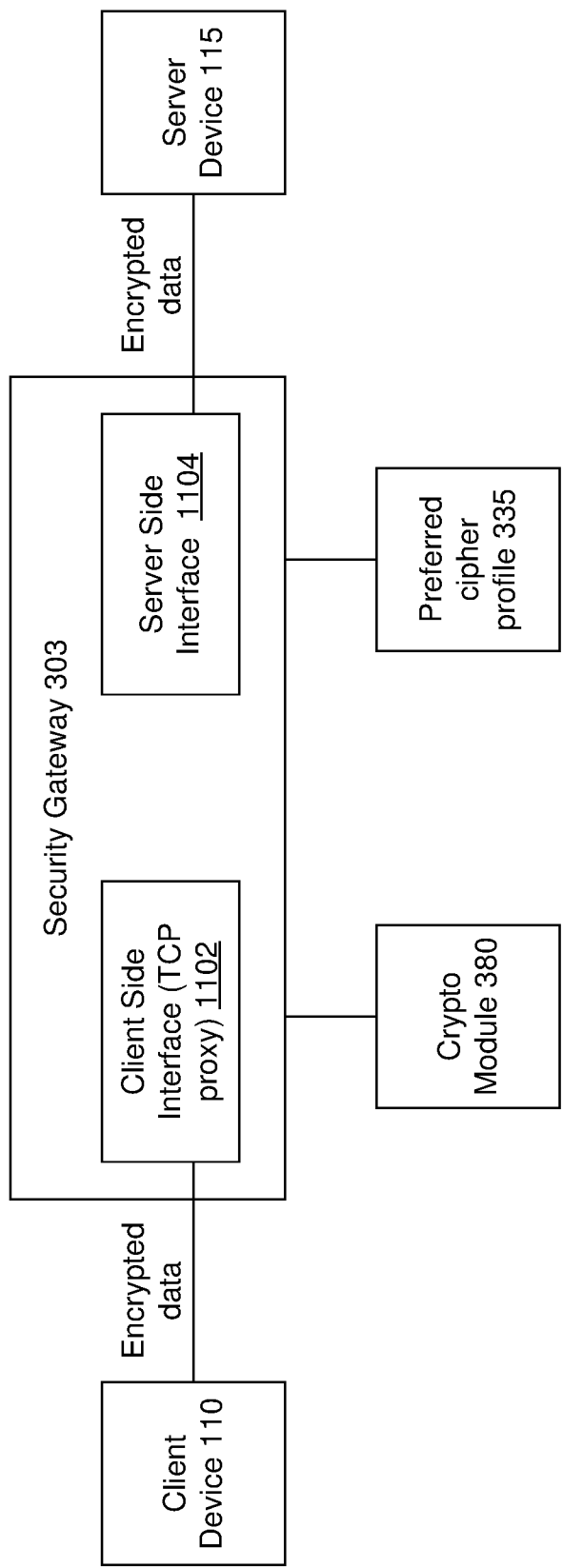
FIG. 11A illustrates an exemplary embodiment of a security gateway.

FIG. 11A illustrates an exemplary embodiment of a security gateway 303. Security gateway 303 has a client side interface 1102 and a server side interface 1104. While only two interfaces are depicted here, security gateway 303 can have any number of interfaces. Additionally, security gateway 303 may be two separate hardware devices, each having only a single interface (client side interface or server side interface). In FIG. 11A, client side interface 1102 communicates with client device 110 and receives encrypted data (and optionally unencrypted data as well) from client device 110. Client side interface 1102 of security gateway 303 is further in communication with crypto module 380, as discussed herein. Server side interface 1104 receives encrypted data (and optionally unencrypted data as well) from server device 115. Server side interface 1104 of security gateway 303 is further in communication with preferred cipher profile 335, as discussed herein.

Figure 11B:
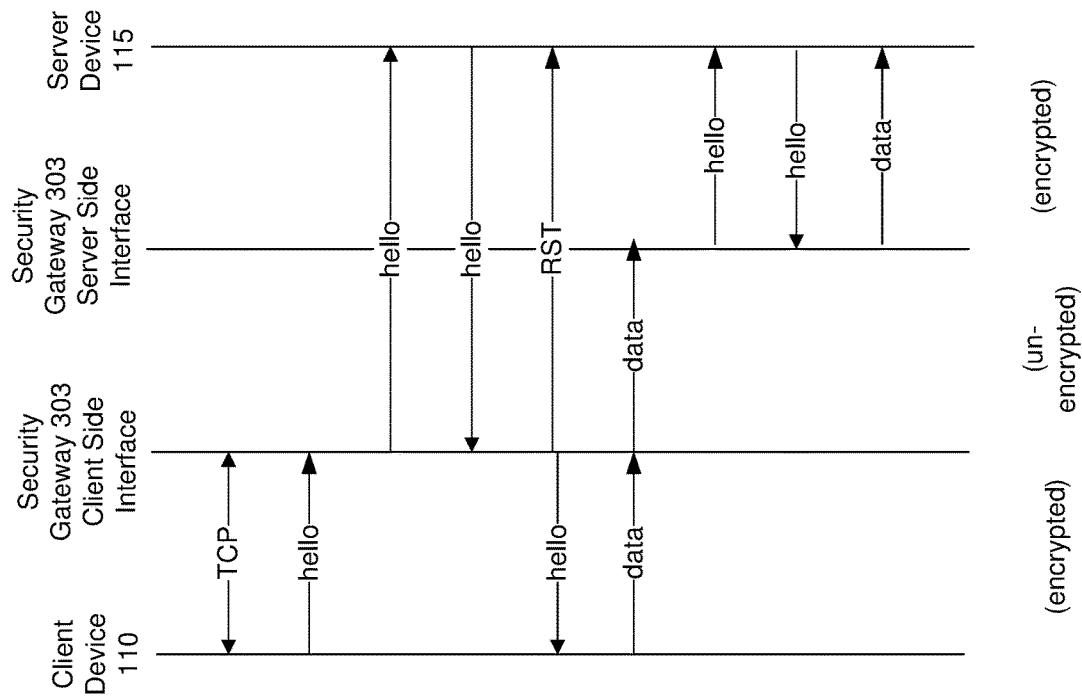
FIG. 11B illustrates an exemplary message sequence chart for implementing various embodiments of the present disclosure.

FIG. 11B illustrates an exemplary message sequence chart for implementing various embodiments of the present disclosure. Security gateway 303 has two network interfaces, for establishing separate sessions with the client device 110 and the server device 115. Both network interfaces can be present in the same hardware device, such as network node 510 of FIG. 2, or there can be separate hardware devices for each network interface.

In the exemplary embodiment of FIG. 11B, a secure TCP session is first established between client device 110 and security gateway 303 client side interface 1102. After establishing the secure session, a hello message is then sent from client device 110 to the security gateway, which is then transmitted to server device 115 through security gateway 303 server side interface 1104. Server device 115 returns the hello message over an encrypted session, and a reset message is sent in reply. After a secure session has been established between client device 110 and security gateway 303 and a secure session has been established between server device 115 and security gateway, then security gateway 303 can transmit data from client device 110 to server device 115 over the two secure sessions.

The above description is illustrative and not restrictive. Many variations of the invention will become apparent to hose of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for transmitting data from a client device to a server device via secure sessions with a security gateway device, the method comprising:
    establishing a first secure session between the client device and the security gateway;
    establishing a second secure session between the server device and the security gateway;
    retrieving a server certificate from the server device;
    determining the validity of the retrieved server certificate by comparing the retrieved server certificate against a pre-stored certificate table at the security gateway;
    determining that the server certificate is invalid; and
    selecting and applying a security policy to the first secure session, the security policy including a condition and an action, wherein the action comprises performing a session bypass by:
        disconnecting the second secure session between the gateway and the server device;
        establishing a bypass session between the gateway and the server device;
        thereafter, transmitting data from the client device to the server device via the first secure session and the bypass session; and applying proxy processing to the bypass session between the gateway and the server device.

2. The method of claim 1, wherein the server certificate comprises at least one of a certificate identity, a SNI (Server Name Indication), a server name, a hostname, a wildcard name, or a string of characters.

3. The method of claim 1, wherein the comparing further comprises matching the server certificate with a stored valid certificate in the certificate table.

4. The method of claim 3, further comprising determining an expiration time of the valid certificate has not passed.

5. The method of claim 1, wherein the comparing further comprises matching the server certificate with a stored revoked certificate in the certificate table.

6. The method of claim 1, wherein the comparing further comprises matching the server certificate with a stored valid certificate and a stored revoked certificate in the certificate table.

7. The method of claim 1, wherein the comparing further comprises determining no match exists for the server certificate in the certificate table.

8. The method of claim 1, wherein the validating the retrieved server certificate comprises communicating, by the security gateway, with a networked certificate validation server to validate server certificate.

9. The method of claim 8, wherein the networked certificate validation server comprises a Certificate Revocation List (CRL) or Online Certificate Status Protocol (OCSP).

10. The method of claim 1, wherein the condition comprises one or more of an SNI, one or more validation error indications, and client device information including client device network address.

11. The method of claim 1, wherein the action comprises disconnecting or resetting the first secure session and the second secure session by the security gateway.

12. The method of claim 1, wherein the action comprises performing security interception of the first secure session and second secure session by:
  generating a gateway certificate using the server certificate;
  receiving secure content from client device over the first secure session;
  decrypting the secure content using a symmetric session key derived from a handshake with the client device and the generated gateway certificate;
  inspecting the decrypted secure content;
  encrypting the decrypted secure content using the symmetric session key derived from a handshake with the server device and the server certificate; and
  transmitting the encrypted content over the second secure session to the server device.

13. The method of claim 12, further comprising applying one or more additional security measures or policies during the inspection process.

14. The method of claim 1, further comprising:
  generating a security report with one or more criteria based on server device information, server certificate information such as SNI, client device information, a security policy, a revocation reason, a security policy action, and a certificate validation error.

15. The method of claim 1, further comprising utilizing a hardware-based crypto module of the security gateway for at least one of the first secure session and second secure session.

16. A method for transmitting data from a client device to a server device via secure sessions with a security gateway device, the method comprising:
  receiving, at a security gateway, a session request from a client device to establish a secure session with a server device;
  establishing, at the security gateway, a first secure session with the client device;
  determining, by the security gateway, a security policy to allow the requested session to bypass security examination, the security policy including a condition and an action, wherein the action comprises performing a session bypass by:
    disconnecting the second secure session between the gateway and the server device;
    establishing a bypass session between the gateway and the server device;
    thereafter, transmitting data from the client device to the server device via the first secure session and the bypass session; and
    applying proxy processing to the bypass session between the gateway and the server device;
  establishing, by the security gateway, a bypass secure session with the service device; and
  transmitting a plurality of data packets from the client device to the server device via the bypass secure session.

17. The method of claim 16, wherein the security gateway performs TCP proxy gateway functionality.

18. The method of claim 16, further comprising:
  receiving at the security gateway, a plurality of data packets from the server device via the bypass secure session; and
  transmitting the received plurality of data packets to the client device via the first secure session.

* * * * *